United States Patent
Mital et al.

(10) Patent No.: US 7,599,901 B2
(45) Date of Patent: Oct. 6, 2009

(54) PROCESSING DATA-CENTRIC BUSINESS MODELS

(75) Inventors: Vijay Mital, Sammamish, WA (US); Andrew Robert Miller, Issaquah, WA (US); Alexander Stojanovic, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 358 days.

(21) Appl. No.: 11/567,630

(22) Filed: Dec. 6, 2006

(65) Prior Publication Data

US 2008/0140601 A1    Jun. 12, 2008

(51) Int. Cl.
*G06F 17/00*   (2006.01)
*G06N 5/02*    (2006.01)

(52) U.S. Cl. ...................................................... 706/46
(58) Field of Classification Search .................... 706/46
See application file for complete search history.

(56) References Cited

U.S. PATENT DOCUMENTS

| | | | | |
|---|---|---|---|---|
| 5,682,545 | A * | 10/1997 | Kawasaki et al. | 712/41 |
| 5,969,976 | A * | 10/1999 | Kawasaki et al. | 708/655 |
| 5,991,545 | A * | 11/1999 | Kawasaki et al. | 712/33 |
| 6,122,724 | A * | 9/2000 | Kawasaki et al. | 712/41 |
| 6,205,535 | B1 * | 3/2001 | Kawasaki et al. | 712/33 |
| 6,253,308 | B1 * | 6/2001 | Kawasaki et al. | 712/210 |
| 6,272,620 | B1 * | 8/2001 | Kawasaki et al. | 712/41 |
| 6,343,357 | B1 * | 1/2002 | Kawasaki et al. | 712/210 |
| 6,421,664 | B1 * | 7/2002 | Groeschel et al. | 707/3 |
| 6,848,110 | B2 * | 1/2005 | Salmon | 719/328 |
| 6,996,700 | B2 * | 2/2006 | Kawasaki et al. | 712/210 |
| 2008/0189235 | A1 | 8/2008 | Mital | |

OTHER PUBLICATIONS

Development of a GPS codeless receiver for ionospheric calibration and time transfer Chang Bok Lee; Dong Doo Lee; Nak Sam Chung; Ik Soo Chang; Kawai, E.; Takahashi, F.; Instrumentation and Measurement, IEEE Transactions on vol. 42, Issue 2, Apr. 1993 pp. 494-497 Digital Object Identifier 10.1109/19.278610.*

Ionospheric models and measurements for common-view time transfer Weiss, M.; Zhang, V.; Jensen, M.; Powers, E.; Klepczynski, W.; Lewandowski, W.; Frequency Control Symposium and PDA Exhibition, 2002. IEEE International May 29-31, 2002 pp. 517-521 Digital Object Identifier 10.1109/FREQ.2002.1075938.*

(Continued)

*Primary Examiner*—Michael B Holmes
(74) *Attorney, Agent, or Firm*—Workman Nydegger

(57) ABSTRACT

The present invention extends to methods, systems, and computer program products for processing data-centric business models. An execution engine accesses a commingled data-centric application model that includes a data model for a data store and a business logic model for interacting with data entities contained in the data store. The execution engine receives an event related to the data store and identifies an involved data entity corresponding to the received event. The execution engine identifies a business logic rule indicated as affecting the involved data entity. The execution engine establishes a context for evaluating the identified business logic rule. The execution engine evaluates the conditions of the business logic rule in accordance with the established context. The execution engine executes any appropriate actions indicated in the business logic rule as a result of the conditions of the business logic rule being satisfied.

20 Claims, 2 Drawing Sheets

OTHER PUBLICATIONS

An application of GPS dual frequency codeless receiver for ionospheric delay to single frequency VLBI observation Imae, M.; Kondo, T.; Amagai, J.; Kaneko, A.; Miki, C.; Precision Electromagnetic Measurements, 1990. CPEM '90 Digest., Conference on Jun. 11-14, 1990 pp. 13-14 Digital Object Identifier 10.1109/CPEM. 1990.109902.*

Long term and long distance GPS time transfer corrected by measured ionospheric delay Imae, M.; Kawai, E.; Aida, M.; Instrumentation and Measurement, IEEE Transactions on vol. 42, Issue 2, Apr. 1993 pp. 490-493 Digital Object Identifier 10.1109/19.278609.*

GPS time interval and state measurement for PARCS Harris, I.; Sien Wu; Bertiger, W.; Frequency control symposium and pda exhibition jointly with the 17th european frequency and time forum, 2003. proceedings of the 2003 ieee international May 4-8, 2003 pp. 185-190 Digital Object Identifier 10.1109/FREQ.2003.1275085.*

Small-sized low-loss reflector filters utilizing reflection of Bleustein-Gulyaev-Shimizu and shear horizontal waves at free edges of substrate Kadota, M.; Ago, J.; Horiuchi, H.; Morii, H.; Ultrasonics Symposium, 1999. Proceedings. 1999 IEEE vol. 1, Oct. 17-20, 1999 pp. 55-59 vol. 1 Digital Object Identifier 10.1109/ULTSYM.1999. 849355.*

An application of GPS dual frequency codeless receiver for ionospheric delay to single frequenc band VLBI observation Inae, M.; Kondo, T.; Jun Amagai; Kaneko, A.; Miki, C.; Instrumentation and Measurement, IEEE Transactions on vol. 40, Issue 2, Apr. 1991 pp. 208-211 Digital Object Identifier 10.1109/TIM.1990.1032917.*

Improving the NIST Ionospheric Measurement System [for international time transfer] Weiss, M.A.; Jefferts, S.; Gaudron, L.; European Frequency and Time Forum, 1996. EFTF 96., Tenth (IEE Conf. Publ. 418) Mar. 5-7, 1996 pp. 399-404.*

* cited by examiner

PROCESSING DATA-CENTRIC BUSINESS MODELS

CROSS-REFERENCE TO RELATED APPLICATIONS

Not Applicable.

BACKGROUND

Background and Relevant Art

Computer systems and related technology affect many aspects of daily life in society. Computer systems commonly perform a great variety of tasks (e.g., word processing, scheduling, database management, etc.) that aid in work and business productivity. Such tasks are generally accomplished by processing functions within software applications.

Generally, software application developers design software applications to provide a certain type of functionality. For example, some applications are tailored to word processing; other applications are tailored to data management. Often, users of such software applications desire to tailor the functionality of the application to their specific needs. For example, a user of a data management application may desire to add form processing functionality that was not included in the original application. Such a user could, optionally, pay for a systems integrator to come to the user's office and reconfigure or extend the application to include the desired functionality. Alternatively, if the user's company was large enough to have an IT department, the user could ask his or her IT manager to code in the additional functionality. This may, of course, require a great deal of time from an already busy IT manager. As a last option, the user may opt to write the extension themselves, assuming the user has sufficient knowledge and available time to dedicate to such a task.

In addition to the resource requirements, allowing users to create their own application extensions can be problematic. Many users have neither the time nor the savvy to write a fully functionally application extension. Furthermore, once completed, the extension may only be configured to work on that particular user's computer system. This creates portability problems if other users want to use the extension. For these reasons, many software developers have attempted to allow users to modify their applications without having to write code.

To accomplish this, the developer can do at least one of two things: 1) implement a code generator, where a user inputs or selects a set of rules to be followed when certain actions are performed and the code generator generates the corresponding code for the application extension, or 2) implement a model engine approach where a model of the extension is turned into an object tree such that each object corresponds to the model and the model engine is able to execute the object tree.

The first approach (code generation) has several limitations. For example, it may be difficult to determine which portion of generated code relates to which part of the model. Thus, if a user wanted to use only part of the extension's functionality, it may be difficult to determine which portion to use. Furthermore, when changes are made to the model, the code for the entire extension has to be regenerated which may introduce undesirable processing delays. The second approach (model engine), although widely implemented, is still of limited use. Generally, model engines are only used for relatively simple things such as modeling workflows and corporate business policies. Providing users with the ability to extend and modify applications without using code has proved to be a difficult task.

BRIEF SUMMARY

The present invention extends to methods, systems, and computer program products for processing data-centric business models. An execution engine accesses a commingled data-centric application model that includes a data model for a data store and a business logic model for interacting with data entities contained in the data store. The business logic model is associated with an index tree of one or more business logic rules represented in the business logic model. Each business logic rule in the index tree identifies at least one data entity in the data store that is affected by the business logic rule.

The execution engine receives an event related to the data store. The execution engine identifies an involved data entity corresponding to the received event. The execution engine scans the index tree to identify a business logic rule indicated as affecting the involved data entity.

The execution engine establishes a context for evaluating the identified business logic rule, including fetching any additional data entities based on the conditions of the identified business logic rule. The execution engine evaluates the conditions of the business logic rule in accordance with the established context. The execution engine executes any appropriate actions indicated in the business logic rule as a result of the conditions of the business logic rule being satisfied.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
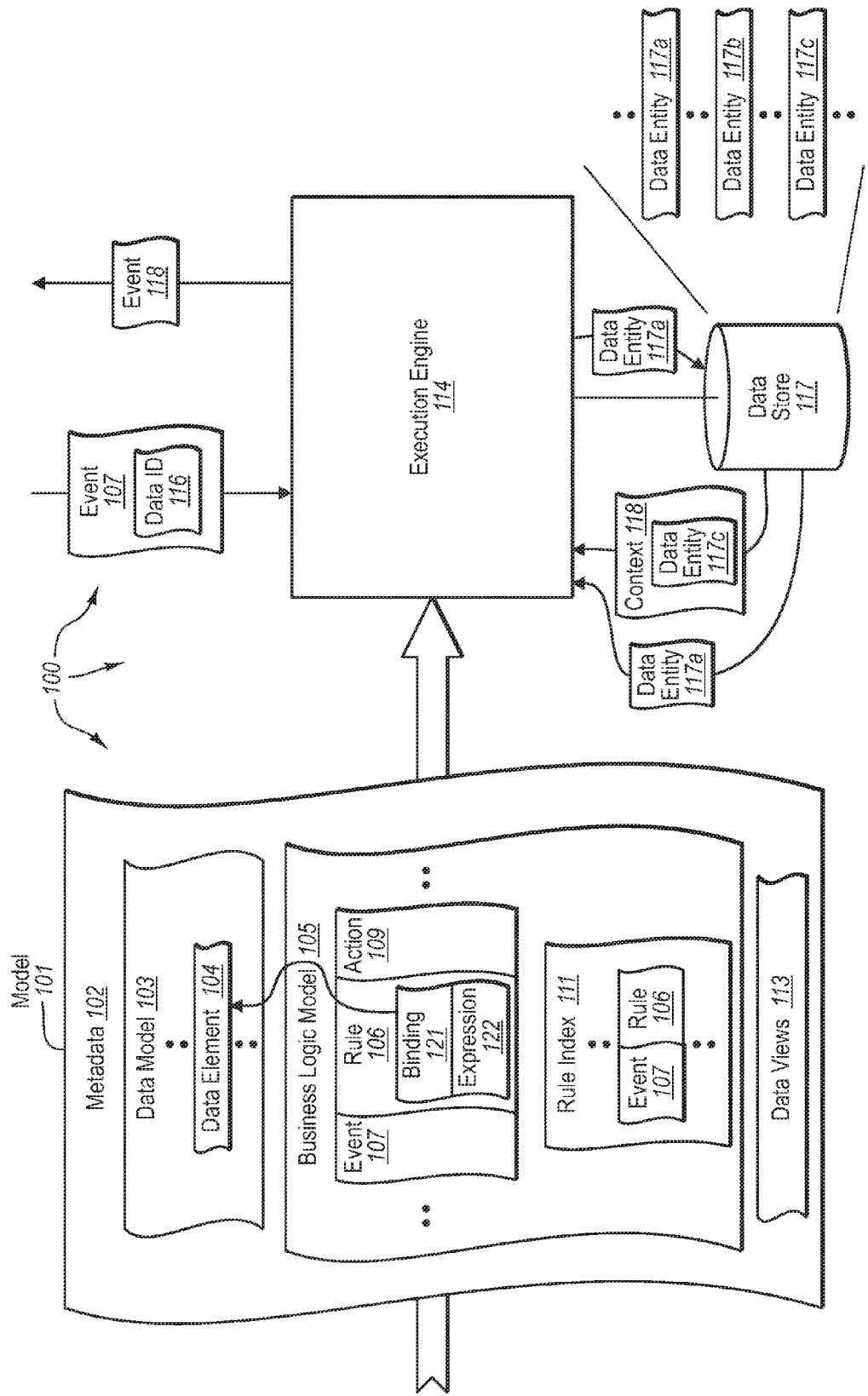
FIG. 1 illustrates an example computer architecture that facilitates processing data-centric business models.

The present invention extends to methods, systems, and computer program products for processing data-centric business models. An execution engine accesses a commingled data-centric application model that includes a data model for a data store and a business logic model for interacting with data entities contained in the data store. The business logic model is associated with an index tree of one or more business logic rules represented in the business logic model. Each business logic rule in the index tree identifies at least one data entity in the data store that is affected by the business logic rule.

The execution engine receives an event related to the data store. The execution engine identifies an involved data entity corresponding to the received event. The execution engine scans the index tree to identify a business logic rule indicated as affecting the involved data entity.

The execution engine establishes a context for evaluating the identified business logic rule, including fetching any additional data entities based on the conditions of the identified business logic rule. The execution engine evaluates the conditions of the business logic rule in accordance with the established context. The execution engine executes any appropriate actions indicated in the business logic rule as a result of the conditions of the business logic rule being satisfied.

Embodiments of the present invention may comprise a special purpose or general-purpose computer including computer hardware, as discussed in greater detail below. Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, computer-readable media can comprise physical (or recordable type) computer-readable storage media, such as, RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

In this description and in the following claims, a "network" is defined as one or more data links that enable the transport of electronic data between computer systems and/or modules. When information is transferred or provided over a network or another communications connection (either hardwired, wireless, or a combination of hardwired or wireless) to a computer, the computer properly views the connection as a computer-readable medium. Thus, by way of example, and not limitation, computer-readable media can also comprise a network or data links which can be used to carry or store desired program code means in the form of computer-executable instructions or data structures and which can be accessed by a general purpose or special purpose computer.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

FIG. 1 illustrates an example computer architecture 100 that facilitates processing data-centric business models. Computer architecture 100 includes execution engine 114 and data store 117. Generally, execution engine 114 can be configured to understand commingled data-centric application models that commingle data models for data stores along with business logic models for interacting with data entities contained in the data stores. Through reference to commingled data-centric application models, execution engine 114 can implement data-centric application functionality. Data-centric applications can be used to incorporate data into a form, display data in a graph or a chart, categorize and/or label different portions of the data, develop workflows based on the data, or any other data-related task. For example, commingled data models can be processed to implement workflow applications related purchasing, inventory management, manufacturing control, etc.

Generally, a data store can be any data source accessible to execution engine 114, such as, for example, a relational database, a Web service, an infofeed, a sharepoint, etc. Thus, accessed and processed data entities can vary accordingly to the type of data store. For example, data entities can include relational data (e.g., values of data fields from related data tables), services, business objects, lists, Web parts, etc.

Thus, data store 117 can be one of a plurality of data stores accessible to execution engine 114. Data store 117 can store a variety of differently formatted data entities, including data entities 117a, 117b, and 117c. Data entities 117a, 117b, and 117c can represent field values from the same or different records and/or tables in a relational database.

Generally, execution engine 114 can receive events via a variety of communication mechanisms, such as, for example, Web services, asynchronous queues, and local method calls. Execution engine 114 can receive different types of events, such as, for example, data events, timer events, and form events. Data events can include indicated changes to data in a data store or indications that a data threshold has been reached. Timer events can include indications that some monitored period of time has elapsed. Form events can include indications that a user is navigating a form or changing data at a form. For example, one or more forms can be used to interface with data entities in data store 117. Form events can result from interaction with the one or more forms.

In response to events, execution engine 114 can evaluate a set of rules (e.g., representing business logic) against the state of data in a data store. Events can include pre-events and post-events. Pre-events are processed to determine if a proposed action will violate any rules. For example, if a process requests to lock inventory for a particular order, a pre-event is sent to execution engine 114. Execution engine 114 evaluates applicable rules against the particular order, as well as against related data entities, such as, for example, line items and customer, to determine if any rule would be violated by allow the inventory to be locked. An indication of whether or not a violation would result can be returned to the process.

Post-events are processed to implement proposed actions (e.g., after a pre-event has determined that a proposed action does not violate any rules). For example, after determining that locking the inventory does not violate any rules, execution engine 114 can process a post-event to lock the inventory. An indication of the any performed actions can be returned to the process.

Rules can relate to any number of different things including: data validation (rules that control software application updates), data integrity (rules that control what happens after software updates), synchronized updates, data snapshots, audits and logs, form flow, user authorization (at row, column, and action level), task flow (i.e. flow of a work process), conditional formatting that controls what users see in a form, based on data or workflow state, policies that determine allowable discretionary actions and automatic actions based on data or workflow state or other means of controlling functionality of a data-centric software application.

Rules can be of a variety of different formats. In some embodiments, a rule includes a data binding to a data entity, a constraint (e.g., an expression over the data entity), and an action. A binding can be of the format: <bindingid, friendly name, URI, [objected], filedref|elementref|recordref>. A namespace resolver included in execution engine 114 can resolve references in a binding to permit the execution engine to access data from a specified data store. When an accessed data entity (e.g., a field of a relational database) satisfies the constraint (e.g., is less than or equal to a specified value), the action is performed (e.g., allowing a purchase order to be created).

Rules can be used to implement business logic for various types of data-centric application behavior. Accordingly, a portion of business logic can include rules to guard and/or impose data quality, such as, for example, validation within the scope of a record, a view or a workflow, integrity requiring consequential actions after some data is changed, and/or synchronization updates involving copying of data from one table to another. Business logic can also include rules to conditionally format a form's user interface (UI). For example, depending on the state of the data, add, show, and/or hide elements in the form, format based on validation and/or authorization rules. Business logic can also include rules to enable navigation and filtering in a form, including cascading choices and filtered lookups, and conditionally enabling and/or showing queries and views in a form. Business logic can also include rules on form and task flow (i.e., how forms are used in sequence or in a set, based on state rules).

Furthermore, rules can be used to invoke authorization policies (e.g. row and column level policies based on user and data state), offline policies (e.g. restrictions on what can be done offline), referential integrity (e.g. ensuring there are no orphan processes, related entries are cascade deleted, etc.) and/or any other form of application behavior. Two examples of using business logic in a data-centric software application are included below. It should be noted that these examples are provided for illustrative purposes only and do not limit the scope of the invention.

The first example is a situation where a Company needs to manage their inventory. The Company can, for example, use business logic within a data-centric software application to manage their inventory. Business logic for implementing inventory management can include:

Conditional formatting: highlight all inventory items where the stock is below the "reorder" level.

Validation: when inventory is being withdrawn, the quantity must be<=the stock.

Integrity: when a product item is deleted from the application, the record of stock in and out transactions is also marked as deleted (can be a soft delete).

Workflow and Synch Update: when stock of an item falls below the reorder level, create a purchase order, copy into it product details, and commit.

The second example is a situation where a Company needs to manage their customer and order forms. The Company also creates subsidiary forms for invoices, shipping, contracts, product details, and other items. Business logic for implementing the management of customer and order forms and creation of subsidiary forms can include:

Validation: if contact type is not equal to "individual," user must fill in company name.

Integrity: customer type should be filled in with a valid customer type, and cannot be null.

State-based Formatting: enable company name if customer type is not equal to "individual."

Navigation: exclusive filter: customer name, filter: customer type

Workflow: to add an order, go to order form in add mode, return, and query; to add a customer, go to another instance of the same form, return, and query.

Business logic can include user-created rules. Furthermore, these rules may be propagated throughout a data-centric application. In some embodiments, business logic may be categorized in the form of declarative macros. Declarative macros, as used herein, are portions of business logic. For example, if a user creates a form for a data-centric application, part of the business logic for the form may be to highlight boxes that have not been filled out and validate the data in the boxes that have been filled out. Accordingly, a declarative macro can include instructions (e.g., XML) for the data-centric application to highlight un-filled boxes. Another declarative macro can include instructions (e.g., also XML) for the data-centric application to validate the data in filled boxes.

Declarative macros can be associated with one or more information items via one or more data organization items. Information items, for example, may include data, forms, data plus forms, form region, task, workflow, user or role. Organization items, for example, may include forms, data structures, workflow descriptions or organization structures. Thus, in some embodiments, declarative macros may be associated with data and/or tasks, for example, via data structures and/or workflow descriptions. Accordingly, business logic can be metadata represented in XML instructions.

The following XML example, represents metadata of a declarative macro:

```
<DeclartiveMacro Type = "Validation">
  <Source>
    <Element>OrderDate</Element>
    <Element>PromiseDate</Element>
  </Source>
  <Scope>global</Scope>
```

-continued

```
<Constraint>
    <Expression PatternType="MinimumDifference">
        <Arguments First= "DeliveryDate" Second="OrderDate"
        Difference ="5"/>
    </Expression>
    <Environment>MacroEvaluator</Environemt>
</Constraint>
<OnFalse>
    <Action PatternType="MinimumDifferenceDenyChange"/>
</OnFalse>
</DeclartiveMacro>
```

Execution of the XML example representing the declarative macro insures that at a Delivery Date is at least 5 days after an Order Date otherwise entry of the a corresponding order is denied. Data within the Source Tag indicates data that is being guarded and implies the data change and forum events are relevant. The scope tag indicates that the declarative macro applies to data irrespective of whether the change happens via a particular form or through direct data update. The environment tag declares whether other modules, besides a macro evaluator, are needed to evaluate the constraint. Actions can include built in or custom actions.

Since data schema and views defining data formats and data access can also be represented in metadata, representing declarative macros in metadata, such as, for example, XML, permits the development of codeless data-centric applications. Data schema can include basic data structures representing formats for lists/tables, fields, properties of files, nested data, relationships keyed on multi-columns, enforced relationships, enforced editing, cascading deletes, etc. Generally, a view indicates a subset of data store sorted and/or displayed in a particular way. Views can include joins, such as, for example, projection of multiple columns from related lists, updates on related records or records sets, such as, for example, concurrency control of update patterns by multiple users (a lightweight:check-out mechanism), reference to external data, such as, for example, binding and synching lists to external data sources. For example, binding fields of one database sources in another database. Accordingly, data-centric applications can be constructed essentially entirely in metadata significantly simplifying application design.

Figure 2:
FIG. 2 illustrates a flowchart of a method for processing a data-centric business model.

FIG. 2 illustrates a flowchart of a method 200 for processing a data-centric business model. The method 200 will be described with respect to the components and data depicted in computer architecture 100.

Method 200 includes an act of accessing a commingled data-centric application model that includes a data model for a data store and a business logic model for interacting with data entities contained in the data store, the business logic model associated with an index tree of one or more business logic rules represented in the business logic model, each business logic rule in the index tree identifying at least one data entity in the data store that is affected by the business logic rule (act 201). For example, execution engine 114 can access model 101. Model 101 includes data model 103, business logic model 105, and data views 113. Data model 103 can include a schema representing the data formats for tables, fields and properties of data store 117, including data element 104. Data element 104 can represent, for example, the data format of data entity 117A (e.g., a value of a data base field).

Business logic model 105 can include one or more rules including rule 106. Rules 106 includes a reference to event 107 (e.g., an input event), a condition 108 that is to be evaluated when event 107 occurs, and an action 109 that is to be implemented when condition 108 is satisfied. Condition 108 further includes binding 121 to data element 104 and expression 122.

Rule index 111 includes one or more entries that map events to corresponding rules. For example, entry 112 maps event 107 to rule 106.

Data views 113 includes one or more views to subsets of data from data store 117.

Method 200 includes an act of receiving an event related to the data store (act 202). For example, execution engine 114 can receive event 107, including data ID 116. Method 200 includes identifying an involved data entity corresponding to the received event (act 203). For example, execution engine 114 can determine that data ID 116 is an identifier for data entity 117a and thus data entity 117A is identified as an involved entity corresponding to event 107. Execution engine 114 can then access an identified entity. For example, execution engine 114 can access data entity 117a from data store 117.

Method 200 includes an act of scanning the index tree to identify a business logic rule indicated as affecting the involved data entity (act 204). For example, execution engine 114 can scan rule index 111 to identify entry 112. Entry 112 indicates that rule 106 is to be implemented when event 107 is received. Since, as depicted in computer architecture 100, event 107 corresponds to data entity 117a (through data ID 116), rule 106 is identified as a rule affecting data entity 117a.

Method 200 includes an act of establishing a context for evaluating the identified business logic rule, including fetching any additional data entities based on the conditions of the identified business logic rule (act 205). For example, execution engine 114 can establish a context for evaluating expression 122. Expression 122 may reference other data from data store 117. For example, when a request for a new purchase order is received, expression 122 may include a formula denying a purchase order when a customer's outstanding balance is equal to or exceeds a specified dollar amount. Thus, to evaluate expression 122 for a new purchase order any other purchase orders for the customer having an outstanding balance are also accessed to establish the context for evaluating expression 122. For example, context 118, including data entity 117C, can be accessed from data store 117, based on condition 108.

Method 200 includes an act of evaluating the conditions of the business logic rules in accordance with the established context (act 206). For example, execution engine 114 can evaluate condition 108. Evaluation of condition 108 can include evaluating expression 122 based on the value of data entity 117a and any values contained in context 118. Referring again to the request for a new purchase order, expression 122 can calculate the sum of the outstanding balance for a customer and determine if the outstanding balance plus the amount for the new purchase order equals or exceeds the specified dollar amount.

Generally, when a condition is not satisfied, execution engine 114 can deny the implementation of a proposed action. For example, when the specified amount is exceeded, execution engine 114 can deny creation of the new purchase order.

Method 200 includes an act of executing any appropriate actions indicated in the business logic rule as a result of the conditions of the business logic rule being satisfied (act 207). For example, execution engine 114 can execute action 109 as a result of condition 108 being satisfied. Execution of an action can include updated existing database values and/or sending output events. For example, execution engine 114 can write data entity 117a back to data store 117 with a new value and can send event 118 (e.g., an output event)

Referring again to the request for a new purchase order, expression 122 may calculate that the sum of the outstanding balance for the customer plus the amount for the new purchase order does not equal or exceed the specified dollar amount. Thus, execution engine can perform the action of creating a new purchase order and can notify a calling process that purchase order creation was allowed.

In some embodiments, execution engine 114 is configured to refer to external data-centric models in response to receiving an event. Through reference to an external data-centric model, execution engine 114 determine how an event is to be processed without requiring that the data-centric model be loaded at execution engine 114.

As previously described, rules in a business logic model can bind directly to data entities represented in a data model. Execution engine 114 can use this information to more efficiently access data. For example, locking can be implemented at a more granular level. When a data field is to be accessed, only the data field, as opposed to a whole record, may be locked.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. At a computer system including a processor and system memory, the computer system also including a model execution engine for executing codeless software applications, the computer system communicatively coupled to one or more data stores, the model execution engine configured to understand application models that commingle data models along with business logic models in meta-data within the application models, the business logic models representing executable business logic rules in the metadata, a method for executing a codeless software application in response to receiving an event to apply business logic contained within a business logic rule to data in the one or more data stores, the method comprising:
   an act of accessing a application model for a codeless software application, the application model containing metadata representing a data model and containing metadata representing a business logic model for the codeless application such that the codeless application is constructed entirely in metadata, the data model including a schema representing data formats for data in a data store, the business logic model including business logic rules for applying business logic to data entities contained in the data store, the metadata representing the business logic model declaring how business logic rules for the codeless application are to operate, the business logic model including an index tree of one or more business logic rules represented in the meta-data of the business logic model, each business logic rule in the index tree identifying at least one data entity to which the business logic rule applies;
   an act of receiving an event related to data in the data store, the event including an identifier identifying a data entity in the data store;
   an act of identifying the data entity corresponding to the received event based on the identifier;
   an act of scanning the index tree to identify a business logic rule that is applicable to the identified data entity;
   an act of the processor invoking the model execution engine to apply the business logic of the indentified business logic rule to the identified data entity, applying the business logic of the identified business logic rule including:
      an act of establishing a context for evaluating the identified business logic rule, including fetching any additional data entities based on the conditions of the identified business logic rule;
      an act of evaluating the conditions of the business logic rule in accordance with the established context; and
      an act of applying any appropriate business logic in the business logic rule to the identified data entity as a result of the conditions of the business logic rule being satisfied such that execution of the codeless application is based on metadata contained in the application model.

2. The method as recited in claim 1, wherein the act of accessing an application model comprises accessing an application model that includes metadata representing data formats for data fields of the data store and metadata representing business logic of the codeless application.

3. The method as recited in claim 2, wherein the accessing an application model that includes metadata representing business logic of the codeless application comprises accessing a business logic rule including an indicated event, a condition, and an action, wherein when the indicated event is detected, the condition is evaluated to determine if the action is to be performed.

4. The method as recited in claim 3, wherein accessing a business logic rule comprises rule including an indicated event, a condition, and an action comprises an act of accessing a business logic rule for performing one of validating data, checking referential integrity of data, synchronizing an update, and authorizing data access.

5. The method as recited in claim 3, wherein accessing a business logic rule comprises rule including an indicated event, a condition, and an action comprises an act of accessing a business logic rule including a condition that has a binding to a data element in the data model.

6. The method as recited in claim 1, wherein the data store is selected from among a relational database, a Web service, an infofeed, and a sharepoint site.

7. The method as recited in claim 1, wherein the act of receiving an event related to the data store comprises an act of receiving one of a data event, a timer event, and a form event.

8. The method as recited in claim 1, wherein the act of receiving an event related to the data store comprises an act of receiving one of a pre-event and a post-event.

9. The method as recited in claim 1, wherein the act of identifying the data entity corresponding to the received event comprises an act of identifying a value for a data field contained in a relational database.

10. The method as recited in claim 1, wherein the act of establishing a context for evaluating the identified business logic rule, including fetching any additional data entities based on the conditions of the identified business logic rule comprises an act of fetching data entities for evaluating an expression contained in a business logic rule condition applicable to the identified data entity.

11. The method as recited in claim 1, wherein the act of evaluating the conditions of the business logic rule in accordance with the established context comprises an act of evaluating an expression based on one or more data entities related to the identified data entity to determine if an action related to the identified data entity is to be performed.

12. The method as recited in claim 1, wherein the act of applying any appropriate actions indicated in the business logic rule to the identified data entity as a result of the conditions of the business logic rule being satisfied comprises an act of updating a value in one of a relational database, a Web service, an infofeed, and a sharepoint site.

13. A computer program product for use at a computer system including a model execution engine for executing codeless software applications, the computer system communicatively coupled to one or more data stores, the model execution engine configured to understand application models that commingle data models along with business logic models in metadata within the application models, the computer program product for implementing a method for executing a codeless software application in response to receiving an event to apply business logic contained within a business logic rule to data in the one or more data stores, the computer-program product comprising one or more computer-readable storage media having stored thereon computer-executable instructions that, when executed by a processor, cause the computer system to perform the following:

access a application model for a codeless software application, the application model containing metadata representing a data model and containing metadata representing a business logic model for the codeless application such that the codeless application is constructed entirely in metadata, the data model including a schema representing data formats for data in a data store, the business logic model including business logic rules for applying business logic to data entities contained in the data store, the metadata representing the business logic model declaring how business logic rules for the codeless application are to operate, the business logic model including an index tree of one or more business logic rules represented in the meta-data of the business logic model, each business logic rule in the index tree identifying at least one data entity to which the business logic rule applies;

receive an event related to data in the data store, the event including an identifier identifying a data entity in the data store;

identify the data entity corresponding to the received event based on the identifier;

scan the index tree to identify a business logic rule that is applicable to the identified data entity;

invoke the model execution engine to apply the business logic of the indentified business logic rule to the identified data entity, applying the business logic of the identified business logic rule including:

establish a context for evaluating the identified business logic rule, including fetching any additional data entities based on the conditions of the identified business logic rule;

evaluate the conditions of the business logic rules in accordance with the established context; and apply any appropriate business logic in the business logic rule to the identified data entity as a result of the conditions of the business logic rule being satisfied such that execution of the codeless application is based on metadata contained in the application model.

14. The method as recited in claim 1, wherein computer-executable instructions that, when executed by a processor, cause the computer system to access an application model comprise computer-executable instructions that, when executed by a processor, cause the computer system to access an application model that includes metadata representing data formats for data fields of the data store and metadata representing business logic of the codeless application.

15. The computer program product of claim 14, wherein computer-executable instructions that, when executed by a processor, cause the computer system to access an application model that includes metadata representing business logic of the codeless application comprises accessing a business logic rule including an indicated event, a condition, and an action, wherein when the indicated event is detected, the condition is evaluated to determine if the action is to be performed.

16. The computer program product of claim 14, wherein computer-executable instructions that, when executed by a processor, cause the computer system to access an application model that includes metadata representing business logic of the codeless application comprise computer-executable instructions that, when executed by a processor, cause the computer system to access a business logic rule including a condition that has a binding to a data element in the data model.

17. The computer program product of claim 13, wherein computer-executable instructions that, when executed by a processor, cause the computer system to establish a context for evaluating the identified business logic rule, including fetching any additional data entities based on the conditions of the identified business logic rule comprise computer-executable instructions that, when executed by a processor, cause the computer system to fetch data entities for evaluating an expression contained in a business logic rule condition applicable to the involved data entity.

18. A computer system, comprising
one or more processors;
system memory; and
one or more computer-readable storage media having stored thereon computer-executable instructions representing a model execution engine, the model execution engine configured to:

understand application models for codeless applications, the application models commingling data models along with business logic models in metadata within the application models, the data models including schema for model data in data stores, the business logic models applying business logic rules to data entities contained in data stores, the metadata representing the business logic model being at least partially contained in declarative macros that declare how business logic rules for the codeless application are to operate;

access an application model for a codeless application, the application model including a data model for a data store and a business logic model for interacting with data entities contained in the data store, the business logic model associated with an index tree of one or more business logic rules represented in the business logic model, each business logic rule in the index tree identifying at least one data entity in the data store that is affected by the business logic rule;

receive an event related to data in the data store, the event including an identifier identifying a data entity in the data store;

identify a data entity corresponding to the received event based on the identifier;

scan the index tree to identify a business logic rule that is applicable to the identified data entity;

apply the business logic of the indentified business logic rule to the identified data entity, applying the business logic of the indentified business rule including:

establishing a context for evaluating the identified business logic rule, including fetching any additional data entities based on the conditions of the identified business logic rule;

evaluating the conditions of the business logic rule in accordance with the established context; and apply any appropriate business logic in the business logic rule to the identified data entity as a result of the conditions of the business logic rule being satisfied such that execution of the codeless application is based on metadata contained in the application model.

19. The computer system as recited in claim 18, wherein the execution engine being configured to access an application model for a codeless application comprises the execution engine being configured to access metadata representing data formats for data fields of the data store and access metadata representing business logic of the codeless application.

20. The computer system as recited in claim 19, wherein the execution engine being configured to access an application model that includes metadata representing business logic of the codeless application comprises the execution engine being configured to access a business logic rule including a condition that has a binding to a data element in the data model.

* * * * *